US012776050B2

(12) United States Patent
Elikhis et al.

(10) Patent No.: US 12,776,050 B2
(45) Date of Patent: Oct. 27, 2026

(54) METHOD AND AN APPARATUS FOR IMPROVING DEPTH CALCULATION

(71) Applicant: INUITIVE LTD., Ra'anana (IL)

(72) Inventors: Edward Elikhis, Ra'anana (IL); Dor Peretz, Kfar Saba (IL)

(73) Assignee: INUITIVE LTD., Ra'Anana (IL)

( * ) Notice: Subject to any disclaimer, the term of this patent is extended or adjusted under 35 U.S.C. 154(b) by 461 days.

(21) Appl. No.: 18/156,145

(22) Filed: Jan. 18, 2023

(65) Prior Publication Data

US 2024/0242363 A1 Jul. 18, 2024

(51) Int. Cl.

| | |
|---|---|
| ***G06K 9/00*** | (2022.01) |
| ***G06T 7/50*** | (2017.01) |
| ***G06V 10/25*** | (2022.01) |
| ***G06V 10/74*** | (2022.01) |

(52) U.S. Cl.

CPC ................ *G06T 7/50* (2017.01); *G06V 10/25* (2022.01); *G06V 10/761* (2022.01)

(58) Field of Classification Search

CPC ........... G06T 7/50; G06T 7/593; G06V 10/25; G06V 10/761

See application file for complete search history.

(56) References Cited

U.S. PATENT DOCUMENTS

| | | | | |
|---|---|---|---|---|
| 5,179,441 A * | 1/1993 | Anderson | H04N 19/597 348/E7.039 |
| 6,606,406 B1 * | 8/2003 | Zhang | G06V 20/64 345/422 |
| 9,361,699 B2 * | 6/2016 | Liao | G06T 7/593 |
| 10,554,957 B2 * | 2/2020 | Valentin | H04N 13/271 |
| 11,651,508 B1 * | 5/2023 | Zhou | G06T 7/593 382/104 |

(Continued)

FOREIGN PATENT DOCUMENTS

| | | | | |
|---|---|---|---|---|
| CN | 104899894 A * | 9/2015 | |
| EP | 3584763 A1 * | 12/2019 | G06V 20/58 |
| WO | WO-2009054683 A1 * | 4/2009 | H04N 13/243 |

OTHER PUBLICATIONS

Real-Time Visibility-Based Fusion of Depth Maps, Paul Merrell et al., IEEE, 2007, pp. 1-8 (Year: 2007).*

(Continued)

*Primary Examiner* — Jayesh A Patel

(74) *Attorney, Agent, or Firm* — FisherBroyles, LLP; Roger L. Browdy; Ronni S. Jillions

(57) ABSTRACT

A computational platform and a method for use in a depth calculation process based on information comprised in an image captured by one or more image capturing sensors, wherein the computational platform enables distinguishing between areas included in the captured image that comprise details that are implementable by a matching algorithm and areas that do not have such details, wherein the computational platform comprises at least one processor, configured to select at least one matching window comprised in the captured image for matching a corresponding part included in each image captured by the one or more image capturing devices; calculate a metric based on a respective selected matching window; and calculate a depth map based on the calculated metric associated with the at least one matching window.

11 Claims, 7 Drawing Sheets

(56) References Cited

U.S. PATENT DOCUMENTS

| | | | | |
|---|---|---|---|---|
| 2001/0043720 | A1* | 11/2001 | Hayashi | G06V 10/24<br>382/106 |
| 2003/0231792 | A1* | 12/2003 | Zhang | G06V 10/24<br>382/154 |
| 2012/0092458 | A1* | 4/2012 | Dedeoglu | H04N 13/271<br>348/46 |
| 2013/0129194 | A1* | 5/2013 | Gusis | G06T 5/50<br>382/154 |
| 2014/0177927 | A1* | 6/2014 | Shieh | G06T 7/593<br>382/154 |
| 2015/0221098 | A1* | 8/2015 | Uemori | G06T 7/30<br>382/154 |
| 2016/0241834 | A1* | 8/2016 | Muninder | G06T 5/50 |
| 2019/0258058 | A1* | 8/2019 | Fortin-Deschênes | G02B 27/017 |
| 2019/0295266 | A1* | 9/2019 | Fan | G06T 7/37 |
| 2022/0398760 | A1* | 12/2022 | Matsumoto | G06T 7/593 |

OTHER PUBLICATIONS

Robust depth enhancement and optimization based on advanced multilateral filters, Ting-An Chang et al., Springer, 2017, pp. 1-12 (Year: 2017).*

An efficient depth map preprocessing method based on structure-aided domain transform smoothing for 3D view generation, Wei Liu et al., PLOS, 2017, pp. 1-20 (Year: 2017).*

Bundled Depth-Map Merging for Multi-View Stereo, Jianguo Li et al., IEEE, 2010, pp. 2769-2776 (Year: 2010).*

A fast area-based stereo matching algorithm, Luigi Di Stefano et al., Elsevier, 2003, pp. 1-23 (Year: 2003).*

* cited by examiner

METHOD AND AN APPARATUS FOR IMPROVING DEPTH CALCULATION

TECHNICAL FIELD

The present disclosure generally relates to methods and apparatus for use in optical devices, and more particularly, for improving processing capabilities for computer visual applications.

BACKGROUND

A stereoscopic camera arrangement is an apparatus made of two camera units, assembled in a stereoscopic module. Stereoscopy (also referred to as "stereoscopics" or "3D imaging") is a technique for creating or enhancing the illusion of depth in an image by means of stereopsis. In other words, it is the impression of depth that is perceived when a scene is viewed with both eyes by someone having normal binocular vision, which is responsible for creating two slightly different images of the scene in the two eyes due to the eyes'/camera's different locations.

Combining 3D information derived from stereoscopic images, and particularly for video streams, requires search and comparison of a large number of pixels to be held for each pair of images, each of which derived from a different image capturing device.

The present invention seeks to provide a computational module that enable improving the robustness of depth calculation based on information received from one or more image capturing devices.

SUMMARY OF THE DISCLOSURE

The disclosure may be summarized by referring to the appended claims.

It is an object of the present disclosure to provide a method and apparatus that implement an innovative method for depth calculation process based on information comprised in an image captured by one or more image capturing devices.

It is another object of the present disclosure to provide a method and apparatus that enable improving the robustness of depth map results getting from information received from one or more image capturing devices.

It is another object of the present disclosure to provide a method and apparatus that enable distinguishing between areas included in the captured image that comprise details that are implementable by a matching algorithm and areas that do not have such details.

Other objects of the present invention will become apparent from the following description.

According to a first embodiment of the disclosure, there is provided a computational platform for use in a depth calculation process based on information comprised in an image captured by one or more image capturing devices (sensors), wherein the computational platform enables distinguishing between areas included in the captured image that comprise details that are implementable by a matching algorithm and areas that do not have such details, wherein the computational platform comprises:

at least one processor, configured to

- select at least one matching window comprised in the captured image for matching a corresponding part included in each image captured by the one or more image capturing devices;
- calculate a metric based on a respective selected matching window; and
- calculate a depth map based on the calculated metric associated with the at least one matching window.

The term "computational platform" as used herein throughout the specification and claims, is used to denote a number of distinct but interrelated units for carrying out a computational process. Such a computational platform can be a computer, or a computational module such as an Application-Specific Integrated Circuit ("ASIC"), or a Field Programmable Gate Array ("FPGA"), or any other applicable processing device.

The terms "image capturing device", "image capturing sensor" and "image sensor" as used herein interchangeably throughout the specification and claims, is used to denote a sensor that detects and conveys information used to make an image. Typically, it does so by converting the variable attenuation of light waves (as they pass through or reflect off objects) into signals. The waves can be light or another electromagnetic radiation. An image sensor may be used in robotic devices, AR/VR glasses, a drone, a digital camera, smart phones, medical imaging equipment, night vision equipment and the like.

According to another embodiment, the metric is based on a physical model of a signal representing the captured image.

In accordance with another embodiment, the at least one processor is further configured to remove outliers' values from each of the at least one selected matching window.

By yet another embodiment, the at least one processor is further configured to apply a normalization function to compensate for the metric's dependency on a number of pixels comprised in the selected matching window.

According to still another embodiment, the at least one processor is further configured to select the metric from among a group that consists of the members:

a) (maxValue−minValue)/std
b) (maxSignal−minSignal)/(maxSignal+minSignal);
c) meanSignal/stdSignal; and
d) medianSignal/stdSignal.

According to another aspect of the disclosure, there is provided a method for use in a depth calculation process based on information comprised in an image captured by one or more image capturing devices (sensors), that enables distinguishing between areas included in the captured image that comprise details that are implementable by a matching algorithm and areas that do not have such details, wherein the method comprises the steps of:

- selecting at least one matching window comprised in the captured image for matching a corresponding part included in each image captured by the one or more image capturing devices;
- calculating a metric based on a respective selected matching window; and
- calculating a depth map based on the calculated metric associated with the at least one matching window.

According to another embodiment of the present aspect of the disclosure the metric is based on a physical model of a signal representing the captured image.

By yet another embodiment of the present aspect of the disclosure the method further comprises a step of removing outliers' values from each of the at least one selected matching window.

In accordance with another embodiment of the present aspect of the disclosure, the method further comprises a step of applying a normalization function to compensate for the metric's dependency on a number of pixels comprised in the selected matching window.

According to still another embodiment of the present aspect of the disclosure, the method further comprises a step of selecting the metric from among a group that consists of the members:

a) (maxValue−minValue)/std b) (maxSignal−minSignal)/(maxSignal+minSignal);

c) meanSignal/stdSignal; and d) medianSignal/stdSignal.

According to another aspect of the present disclosure there is provided a method for use in a depth calculation process based on information comprised in an image captured by one or more image capturing devices, that enables distinguishing between areas included in the captured image that comprise details that are implementable by a matching algorithm and areas that do not have such details, wherein said method comprises the steps of:

providing information associated with an image captured by the one or more image capturing devices;

for one or more pixels comprised in a captured image of one of said one or more image capturing devices, selecting a window for matching a corresponding part included in an image captured by another of the one or more image capturing devices;

based on the selected window, calculating a metric (i,j);

generating an information map is generated by setting the value of InfoMap(i,j)=0 if the value of metric(i,j) is greater than a predefined threshold, else InfoMap(i,j)=1;

calculating depth(i,j) based on corresponding images captured by the one or more image capturing devices, and for all i and j values, where InfoMap(i,j) is equal to zero, setting the value of depth(i,j) to an unknown value.

According to another aspect of the present disclosure, there is provided an image capturing sensor comprising a computational platform as described hereinabove.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

The present invention seeks to provide improved solution for obtaining depth results retrieved by using one or more stereoscopic capturing devices which enables distinguishing between areas in the captured image that do not comprise any informative details (e.g., details that may be implemented by a matching algorithm) as opposed to areas that do have such informative details.

Figure 1:
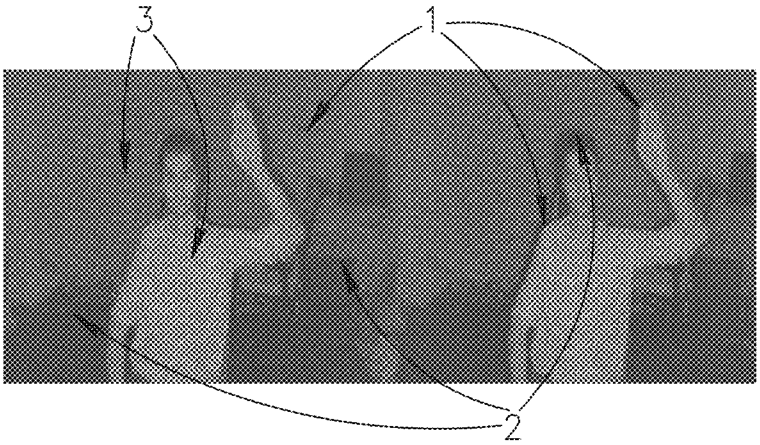
FIG. 1 illustrates an example of a stereo pair of images (right and left images) using the active approach whereby a pattern is projected onto the scene.

Let us first consider an example illustrated in FIG. 1 which presents the results obtained by using a stereo pair of images capturing devices (right and left images).

In this example active approach (i.e., the approach by which a pattern is projected onto the scene) is implemented.

In this FIG. 1, numeral "1" depicts shadow (occlusion) areas, where no pattern is present. As can be appreciated, there is an inherent problem in applying a stereo matching algorithm in order to retrieve required results, as areas comprised therein do not comprise information that would enable calculating robust depth results.

Numeral "2" presents dark areas associated with low signal. If a stereo matching algorithm were to be applied to these areas, the results that will be obtained that way, might have a large error due to a difficulty to distinguish between real texture and noise signal.

Numeral "3" presents areas wherein normal projected patterns are shown. In these areas, a stereo matching algorithm may be successfully used as all the required information for the results to be accurate are included in these areas.

The solution provided by the present invention relies on using a metric that allows to quantitively evaluate the existence of real information in one or more selected windows comprised in a stereo image.

In order to illustrate the present solution, let us consider the following steps.

Figure 2:
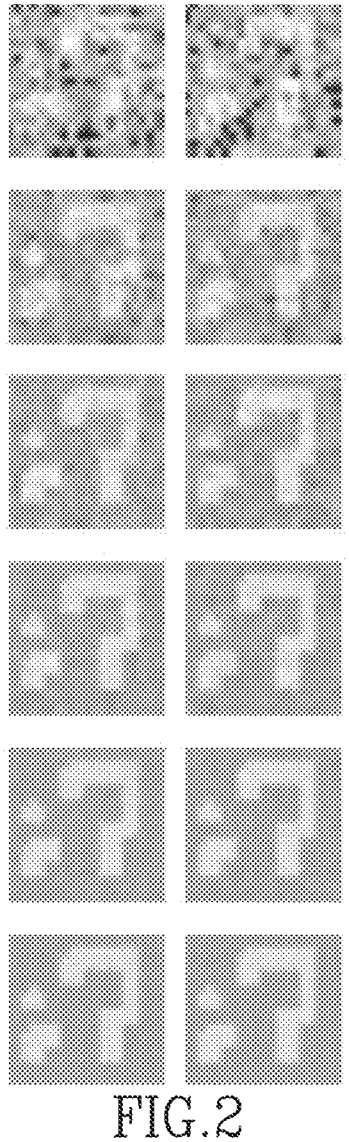
FIG. 2 illustrates an example of a single image that is presented under a plurality of different noise conditions.

First, FIG. 2 depicts a plurality of images, all of which being each a single image under different noise conditions than those of the other images, which is equivalent to capturing the images under different light conditions. It can be clearly seen that the matching procedure between stereo pairs having different noise levels, is an impossible or nearly impossible mission (when the noise level is high with respect to the signal), as opposed to the cases which could yield robust results (at low noise level with respect to the signal, which results in a clear pattern)

Figure 3:
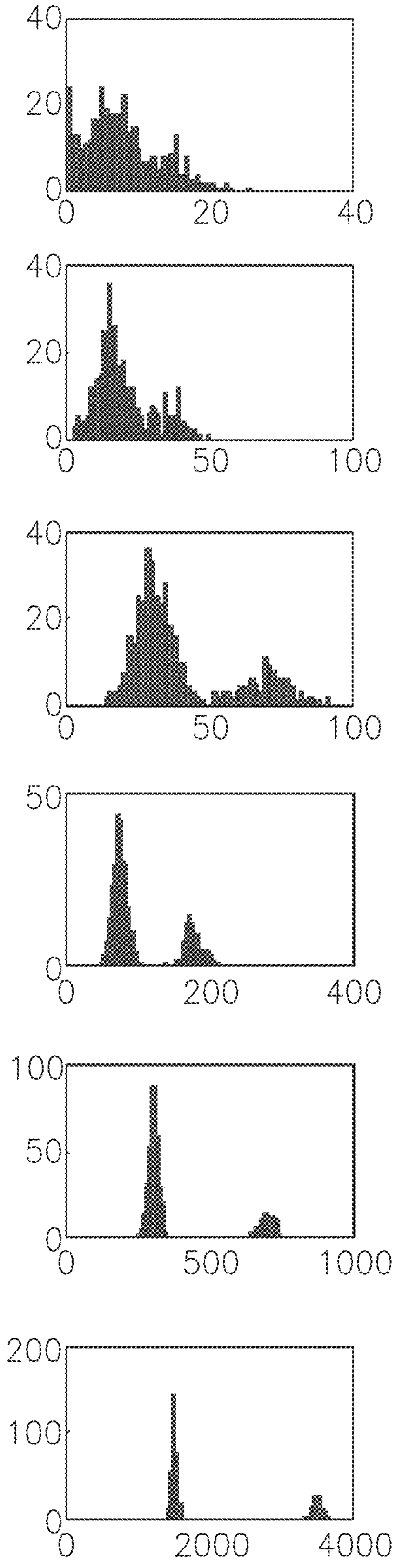
FIG. 3 demonstrates histograms of stereo images at different noise levels, derived from the single image at different noise levels illustrated in FIG. 2.

FIG. 3 presents histograms of the single image under different noise levels depicted in FIG. 2. The two picks at the histograms reflect a distribution of the noisy values at the bright and dark areas of image.

When comparing these histograms with the respective images of claim 2, one may conclude that the farther two peaks are from each other and the smaller the intersection between signals representing light and dark patterns, the easier it would be for the matching algorithm to create a robust result.

In order to reproduce a mathematical metric that would allow evaluating a robustness of the matching results for a specific region, one must be aware of the nature of the noise.

A signal outputted from an image capturing sensor has many noise components. Part of these noise components are related to the light physics while another part, to the image capturing sensor architecture. The most important noise components are shot noise and readout (RO) noise.

A shot noise is a type of noise which can be modeled by a Poisson process. It occurs in photon counting in optical devices, where shot noise is associated with the particle nature of light. For the signal level that we are interested in, it can be described with a good accuracy by a normal distribution. Noise behavior of the signal with average value of X electrons may be formulated as a normal distribution characterized by a standard deviation being equal to the square root of the mean value X.

RO noise has a form of a normal distribution and usually it does not depend on the signal level. This noise is important only for low signals analysis.

As a next step, let us consider an image comprising an area having no texture that is equally illuminated at each point included in this area. As was discussed above, the measured signals of such an image can be represented by a normal distribution with a standard deviation that depends on the average signal level.

Knowing the noise nature, few metrics, that will be further discussed, may be proposed.

First, let us consider a metric that is calculated using the formula (maxValue−minValue)/std where:

maxValue is the maximum value determined from of all pixels included in a selected matching window;

minValue is the minimum value determined from of all pixels included in a selected matching window; and std is the standard deviation of the values of all pixels included in a selected matching window.

Figure 4:
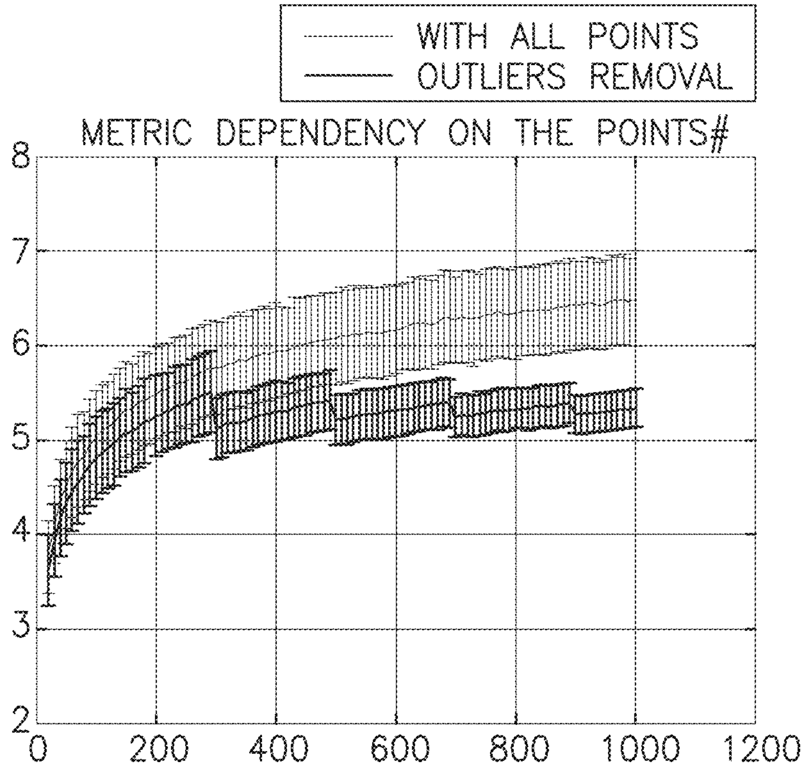
FIG. 4 illustrates a metric behavior as a function of the pixels number included within a selected window.

FIG. 4 illustrates a metric value (y axis) presented as a function of the number of pixels comprised in the selected matching window as a function of the pixels number included in a selected window. In this FIG., two cases are demonstrated. One that relates to all pixels comprised in the selected window and the other after having the outliers removed. The differences between the two demonstrated cases, is mainly due to insufficient statistics in the case of small number of pixels and existence of outliers in the case of the large pixels' number.

In order to remove outliers, a simple procedure was used for the removal of N highest and lowest values from the calculation. The value of N depends on the pixels' number, and is calculated as:

$$N = \max(1, \mathit{pixNumber} * \mathit{outlierPercent})$$

outlierPercent can be optimized per the system. Usually, its value lies in the 0.3-0.8% range. It can be seen that starting from −200 pixels metric calculated without outliers lies in the range of 5.2-5.3 in contradistinction to the original metric that still continues to rise. Variability of the metric without outliers is also smaller compared to the original one.

This reflects a known fact that 99.7% of all normal distribution points are included within the range of 6 sigma.

To compensate for insufficient statistics in cases of small number of pixels, one can introduce a compensation polynomial function, one that depends on the pixels' number.

Figure 5:
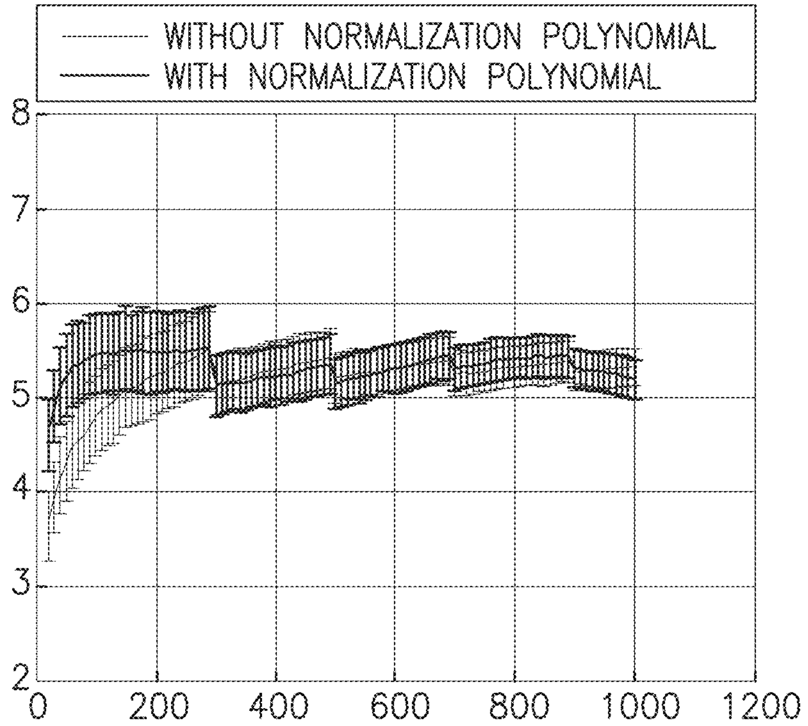
FIG. 5 demonstrates a metric behavior with normalizing procedure being affected.

FIG. 5 demonstrates a metric behavior of the proposed metric while using normalizing polynomial expression and without using normalization procedure. The metric behavior is demonstrated for an area that includes two groups of pixels: one group with a strong (high) signal and one group with a weak (low) signal. To analyze the behavior of the proposed metric a variety of images was simulated by varying the following parameters:

1. Signal levels—number of electrons for the high signal and for the low signal;
2. Ratios of the pixels number associated with the high signal to the pixels number associated with the low signal, in the selected matching window; and
3. Different total pixels' number in the selected matching window.

In the following description, the simulation results are presented. From this description and associated drawings, the metric's dependency on different simulation parameters may be understood.

Figure 6:
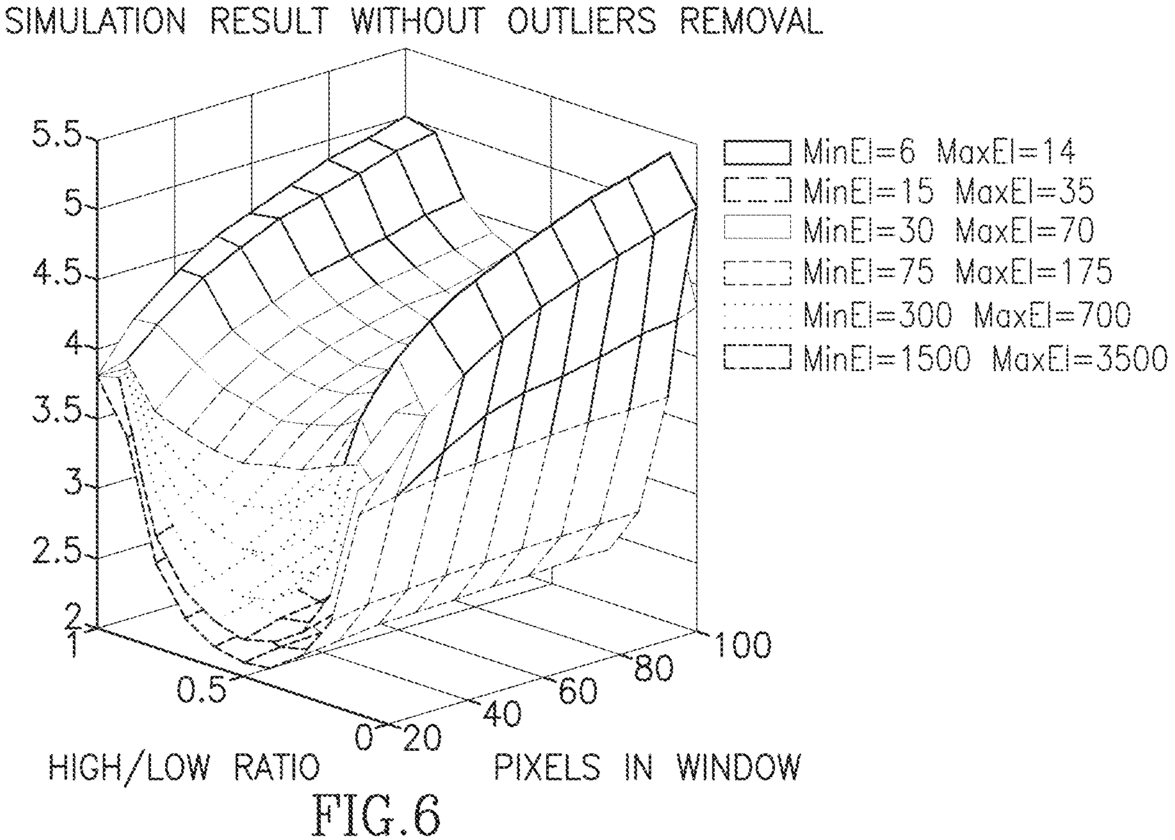
FIG. 6 presents simulation results that were obtained without outliers' removal and without carrying out a normalization procedure.

FIG. 6 presents simulation results that were obtained without outliers' removal and without carrying out a normalization procedure.

Figure 7:
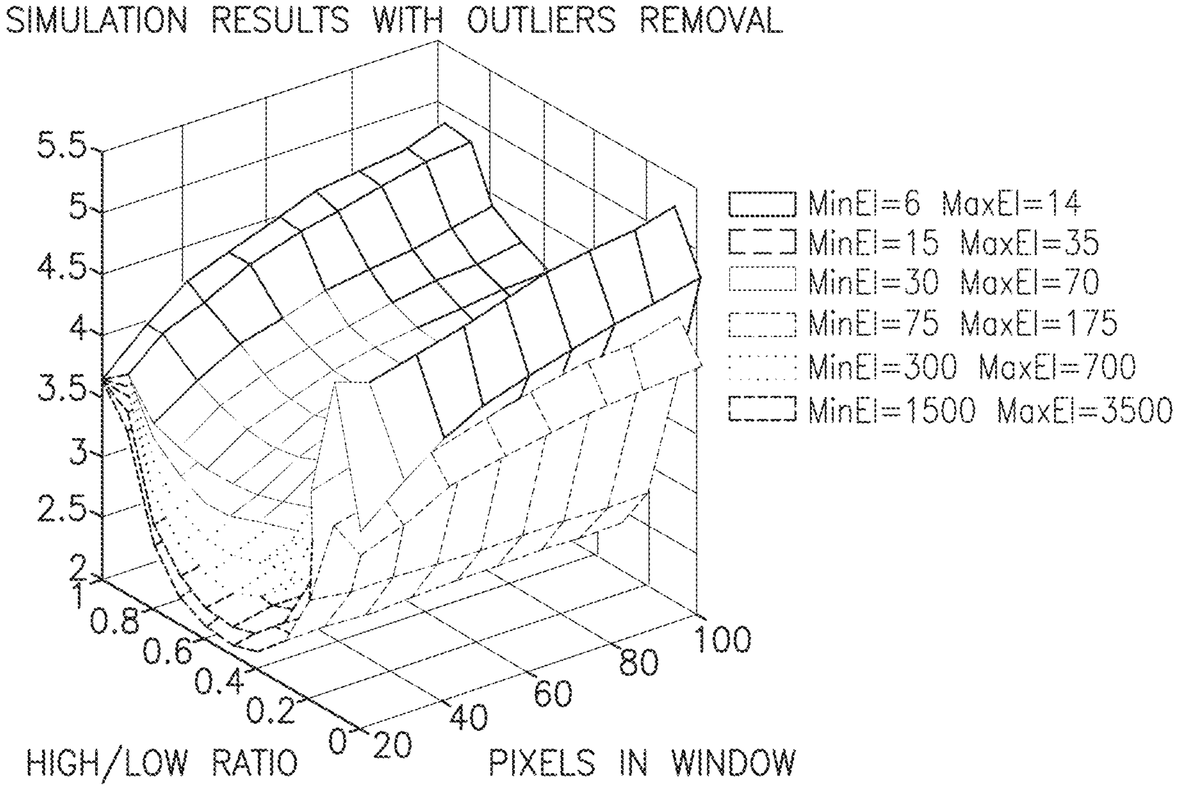
FIG. 7 presents simulation results that were obtained after removing outliers from the data provided.

FIG. 7 presents simulation results that were obtained after removing outliers from the data provided.

Figure 8:
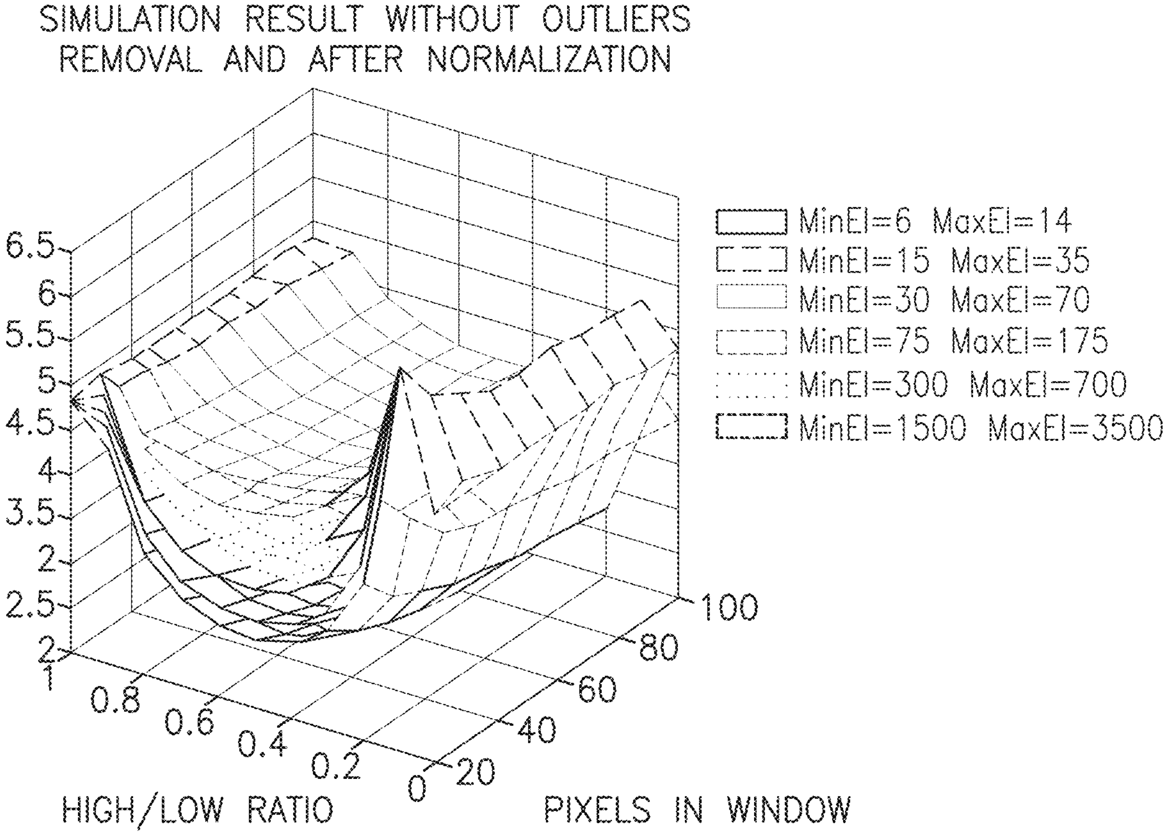
FIG. 8 presents simulation results that were obtained without outliers' removal after affecting a normalization procedure.

FIG. 8 presents simulation results that were obtained without outliers' removal after affecting a normalization procedure.

Figure 9:
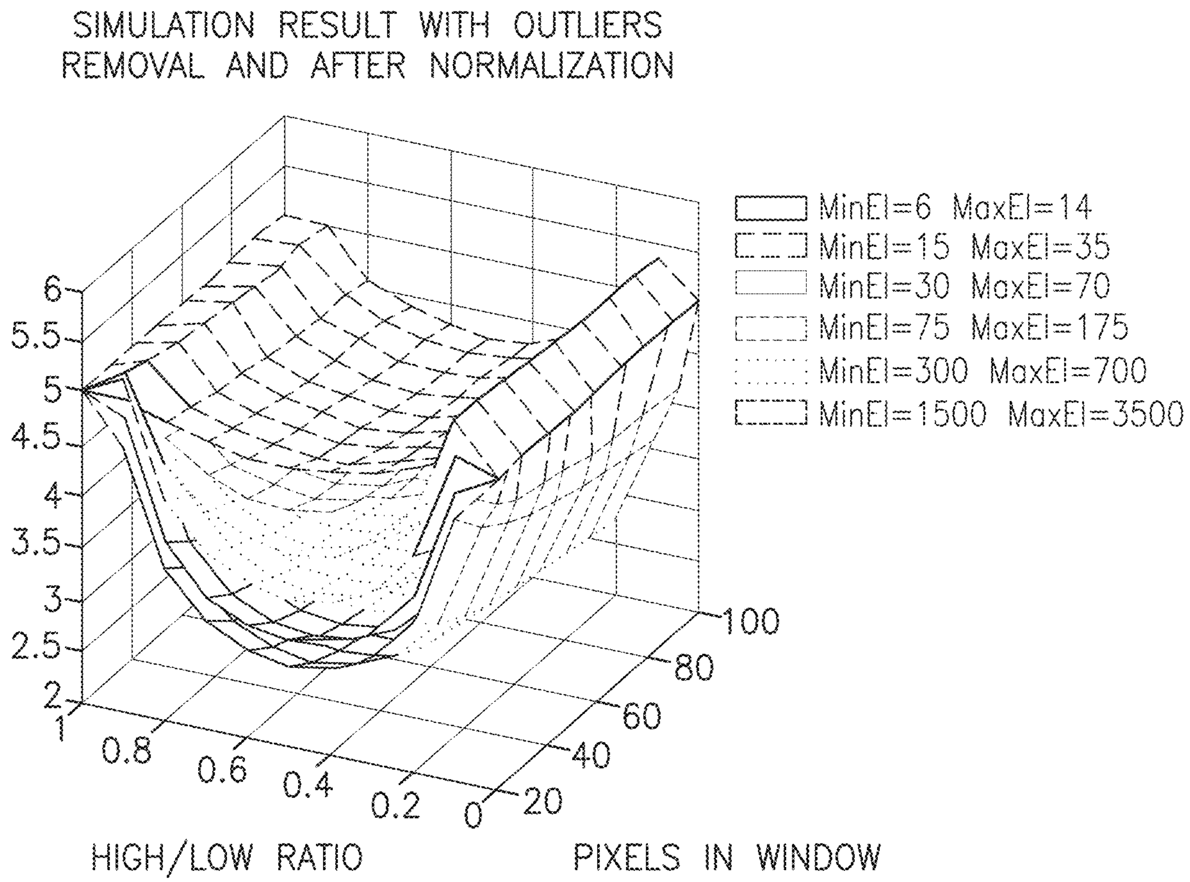
FIG. 9 presents simulation results that were obtained after removing outliers from the data provided and after carrying out a normalization procedure.

FIG. 9 presents simulation results that were obtained after removing outliers from the data provided and after carrying out a normalization procedure.

While aggregating the results obtained from carrying out the various simulations, the following characteristics can be identified:

1. The proposed metric clearly depends on the signals level. For the low signals, the metrics does not really differentiate between areas which comprise two signal levels and homogeneous area which comprise one signal level. An image that demonstrates such a case is shown in the first and second images of FIG. 2. Noise level is so high that it is difficult to distinguish between real signals and noise effects. In such areas, a matching algorithm is noneffective, and the metric reflects this conclusion.
2. For stronger (higher) signals, the simulations show that the metric demonstrates a clear differentiation between homogeneous areas and areas with texture. They also demonstrate the metric's dependency on the ratio between the number of high and low signal pixels. The greatest difference that exists between an area comprising a pattern and a homogeneous area, is demonstrated in the case where the ratio is equal to 0.5. This observation reflects the fact that the more distinguishable details comprised in the selected window, a more robust matching algorithm is achieved.
3. Although affecting the normalization procedure is only optional and not a requirement, still, it may simplify the analysis of the metric result in the case of a different matching window size used for pixels using different spatial image coordinates. Moreover, it can be advisable to use a variable window size and geometry for the purpose of analyzing information retrieved from areas located adjacent to the object's contours or located adjacent to the border of different surfaces.

In addition, other metrics can optionally be used, based on the noise nature are:

(maxSignal−minSignal)/(maxSignal+minSignal);

meanSignal/stdSignal;

medianSignal/stdSignal.

The parameters included in the above metrics, are:

maxSignal is the maximum value of a signal determined for all pixels included in a selected matching window;

minSignal is the minimum value of a signal determined for all pixels included in a selected matching window;

meanSignal is the average value of the signals determined for all pixels included in a selected matching window;

stdSignal is the standard deviation of the signals' values of all pixels included in a selected matching window; and medianSignal is the value of a median for which half of the signals' values of the pixels included in a selected matching window are larger and half of the signals' values of the pixels included in a selected matching window are smaller.

std is the standard deviation of the values of all pixels included in the selected image window.

The above metrics may optionally be used in specific use cases.

Now, all the simulation results discussed above were achieved by using a physical model of the signal that were stored at the image capturing sensor's analog part (the photodiode). A digitalization procedure usually has a linear characteristic so that when applying the selected metric equation, it does not depend on the scaling factor that exists while converting the data from the electrons form to the digital numbers ("DN") form, hence the equation remains essentially the same as before with some minor adaptations:

$$metricDigital = (\max Value - \min Value + eps0)/(stdValue + eps1)$$

wherein:

eps0 stands for a coefficient associated with a special treatment in cases of very low signals, a coefficient that may be disregarded as part of the signal digitalization;

eps1 relates to quantization effects of the digitalization process.

There are various ways of utilizing the metric map discussed above as part of the depth determination process. For example:

1. For each pixel, a bitmap may be generated, wherein the bitmap used in determining whether a matching result for a given pixel may be used or should be discarded.
2. The metric map may be used as an input to evaluate the level of confidence of the result obtained for each pixel, thus allowing the user to decide the confidence level at which results will be acceptable.

Figure 10:
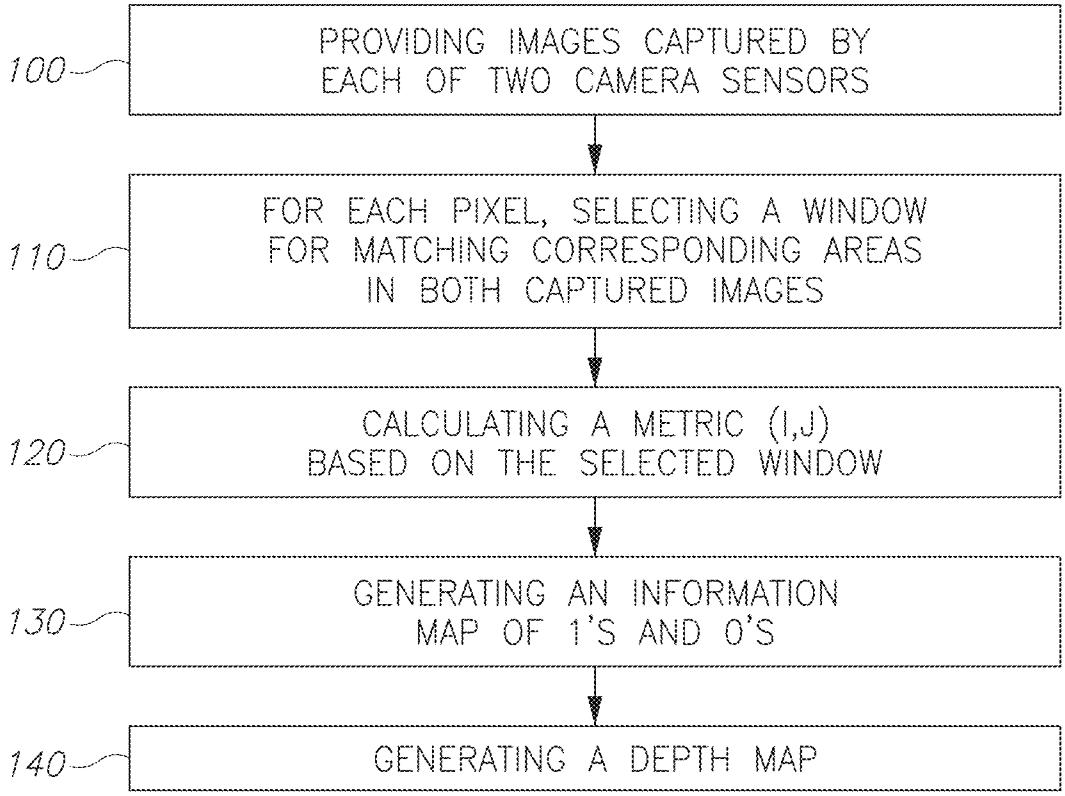
FIG. 10 demonstrates a flow chart of an example of carrying out a method according to an embodiment construed in accordance with the present invention.

FIG. 10 demonstrates a flow chart of an example of carrying out a method according to an embodiment construed in accordance with the present invention.

According to the method demonstrated in this example, an image captured by two image capturing devices is provided (step 100). For each pixel, a processor selects a window for matching a corresponding part included in each image captured by the two image capturing devices (step 110).

Based on the selected window, metric (i,j) is calculated (step 120).

Next, an information map is generated (step 130). The map is generated in the following way, if the value of the metric(i,j)>a predefined threshold then InfoMap(i,j)=0, else InfoMap(i,j)=1.

In step 140, depth(i,j) is calculated based on the corresponding stereo image pairs (or alternatively based on the mono image, if applicable), and for all i, j values, where InfoMap(i,j)=0, setting the value of depth(i,j) to unknown.

In summary, the present solution provides a variety of metrics, each of which is based on the physical model of the signals, as captured by the image capturing sensor. Each of the metrics construed in accordance with the present invention is configured to distinguish between areas that comprise information sufficient to allow robust matching procedure for the depth calculation from the stereo images, as opposed to areas that do not include such information.

The method provided herein relies on a step of removing outliers' values from each selected matching window, thereby achieving more robust results. Optionally, a normalization function is applied to compensate for the metric dependency on the pixels' number in the selected matching window. Finally, the generated metric map may be used in the process of filtering depth results.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A computational platform for use in a depth calculation process based on information comprised in a first image of a target captured by a first image capturing device and a second image of said target captured by a second image capturing device, wherein said computational platform is configured to distinguish between areas included in said first image comprise details related to homogeneous areas and areas with texture that are implementable by a matching algorithm, and areas that do not comprise such details, wherein said computational platform comprises:

at least one processor, configured to select a window comprised in said first captured image for matching a corresponding part included in said second image;

calculate a metric based on the selected window, wherein said metric is configured to distinguish between homogeneous areas and areas with texture as opposed to areas that are not homogeneous areas nor areas with texture, and removing outliers' values associated with said areas that are not homogeneous areas nor areas with texture from said selected matching window; and use the calculated metric to evaluate level of confidence for pixels being matched in the first captured image and the second captured image.

2. The computational platform of claim 1, wherein said metric is based on a physical model of a signal representing the first captured image.

3. The computational platform of claim 1, wherein said removal of outliers' values from the selected window is based on the evaluated level of confidence for pixels associated with said outliers' values.

4. The computational platform of claim 3, wherein said at least one processor is further configured to apply a normalization function to compensate for said metric's dependency on a number of pixels comprised in a respective selected window.

5. The computational platform of claim 1, wherein said at least one processor is further configured to select the calculated metric from among a group that consists of the members:

a) (max Value−min Value)/std b) (maxSignal−minSignal)/(maxSignal+minSignal);

c) meanSignal/stdSignal; and d) medianSignal/stdSignal.

6. An image capturing sensor comprising a computational platform as claimed in claim 1.

7. A method for use in a depth calculation process based on information comprised in a first image of a target captured by a first image capturing device and a second image of said target captured by a second image capturing device, wherein said method is configured to distinguish between areas included in said first image captured by the first image capturing device, that comprise details related to homogeneous areas and areas with texture that are implementable by a matching algorithm, and areas that do not comprise such details, wherein said method comprises the steps of:

selecting a window comprised in the first captured image for matching a corresponding part included in the image captured by the second image capturing device;

calculating a metric based on the selected window, wherein said metric is configured to distinguish between homogeneous areas and areas with texture as opposed to areas that are not homogeneous areas nor areas with texture, and removing outliers' values associated with said areas that are not homogeneous areas nor areas with texture from said selected matching window; wherein said metric is configured to distinguish between homogeneous areas and areas with texture as opposed to areas that are not homogeneous areas nor areas with texture, and removing outliers' values associated with said areas that are not homogeneous areas nor areas with texture from each selected matching window; and using the calculated metric to evaluate level of confidence for pixels being matched in the first captured image and the second captured image.

8. The method of claim 7, wherein said metric is based on a physical model of a signal representing the first captured image.

9. The method of claim 7, wherein the step of removing outliers' values from the selected window, is based on the evaluated level of confidence for pixels associated with said outliers' values.

10. The method of claim 9, further comprising a step of applying a normalization function to compensate for said metric's dependency on a number of pixels comprised in the respective selected window.

11. A method for use in a depth calculation process based on information comprised in a first image of a target captured by a first image capturing device and a second image of said target captured by a second image capturing device, that is configured to distinguish between areas included in said first captured image that comprise details related to homogeneous areas and areas with texture that are implementable by a matching algorithm and areas that do have such details, wherein said method comprises the steps of:

providing information associated with said first captured image and said second captured image;

for one or more pixels comprised in said first captured image, selecting a window for matching a corresponding part included in the second;

based on the selected window, calculating a metric (i,j);

generating an information map is generated by setting the value of InfoMap(i,j)=0 if the value of metric (i,j) is greater than a predefined threshold, else InfoMap (i,j)=1;

calculating depth (i,j) based on corresponding first and second images, and for all i and j values, where InfoMap (i,j) is equal to zero, setting the value of depth (i,j) to an unknown value;

evaluating level of confidence for pixels being matched in the first captured image and the second captured image.

* * * * *